Jan. 6, 1925.
S. W. RAYMOND
BULL WHEEL
Filed Dec. 29, 1922
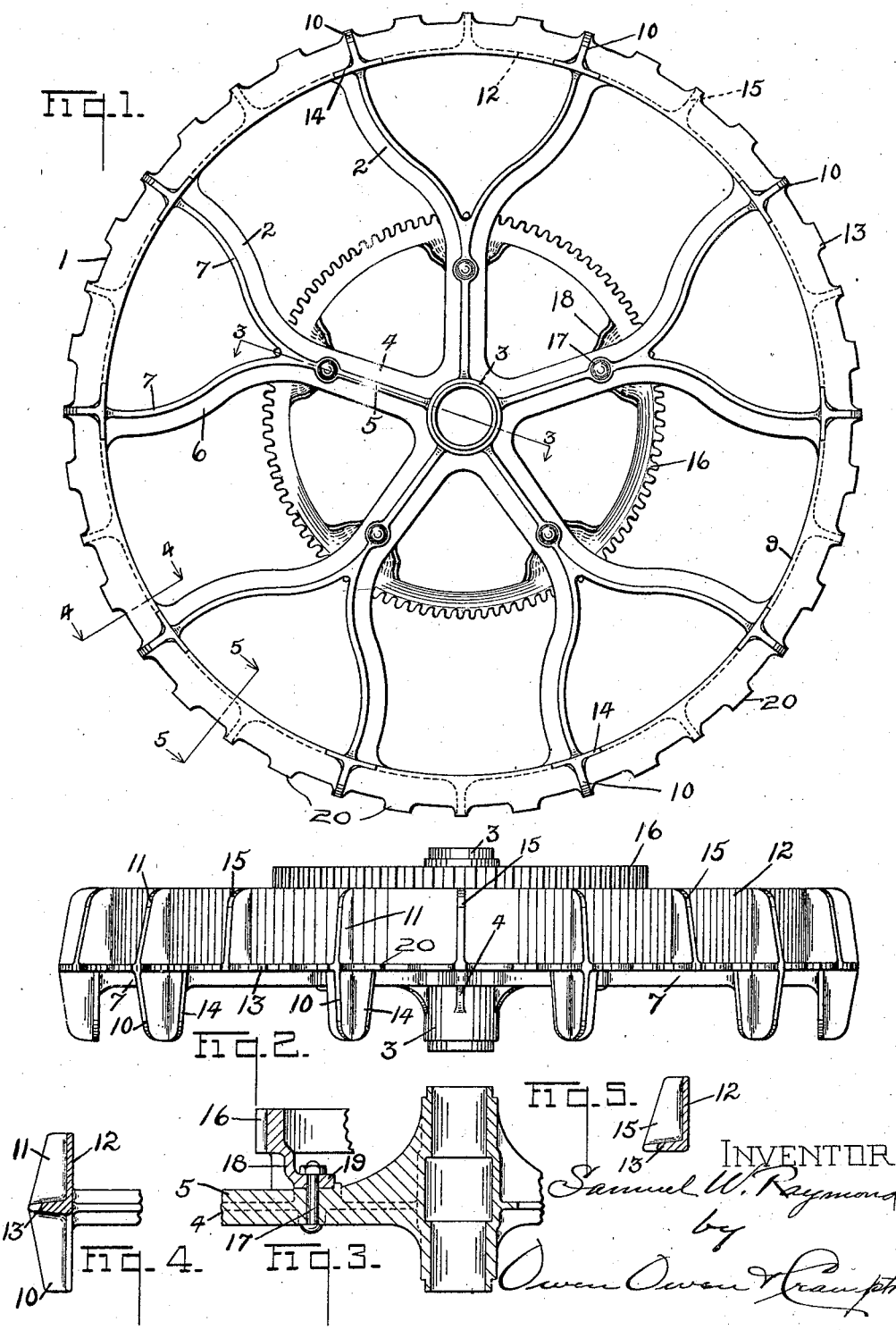

Patented Jan. 6, 1925.

1,521,834

UNITED STATES PATENT OFFICE.

SAMUEL W. RAYMOND, OF ADRIAN, MICHIGAN.

BULL WHEEL.

Application filed December 29, 1922. Serial No. 609,680.

*To all whom it may concern:*

Be it known that I, SAMUEL W. RAYMOND, a citizen of the United States, and a resident of Adrian, in the county of Lenawee and State of Michigan, have made an Invention Appertaining to a Bull Wheel; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient tractor bull wheel for use on paved roads, in sandy soil, or in mud. The bull wheel is thus particularly efficient for plowing and cultivating, as well as when used for draft purposes.

Bull wheels containing the invention may in their details partake of different forms. To illustrate a practical application of the invention I have selected a bull wheel containing the invention and shall describe it hereinafter. The bull wheel selected is illustrated in the accompanying drawings.

Figure 1 of the drawings illustrate a side view of the bull wheel. Fig. 2 illustrates a top view. Fig. 3 illustrates a broken sectional view taken on the line 3—3 indicated in Fig. 1. Fig. 4 is a sectional view taken on the line 4—4 indicated in Fig. 1. Fig. 5 is a sectional view taken on the line 5—5 indicated in Fig. 1.

The bull wheel 1 is formed of malleable cast iron and is provided with Y shaped spokes 2 that extend from the hub 3 to the rim of the wheel. The shanks 4 of the Y's are provided with central flanges 5 that extend from both sides of each shank 4, and radially from the hub 3 to the crotch of the Y. The flanges divide at the crotch and extend along the inside edges of the arms 6 of the Y, as at 7, and form both sides of the arms. The outside of the rim 9 is provided with tractor lugs 10 that extend laterally from the edge of the rim and tractor flanges 11 that extend radially from the lugs and the rim and in line with the outer ends of the flanges 7 of the arms 6 of the Y. The arms 6 and the flanges 7 are curved sinuously from the radial directions of the flanges 5 of the shanks 4 and to the radial directions of the flanges 11 located on the rim 9 and lugs 10.

The rim 9 has a cylindrical band 12 and a flange 13 located in the plane at right angles to the axis of the wheel. The periphery of the flange 13 extends to the top of the tractor lugs 10 and the traction flanges 11. The traction lugs 10 and the flanges 11 extend at right angles to the flange 13.

The lugs 10 are T shaped in cross section, the cross of the T 14 being located in the plane of the band 12 or rim proper of the wheel, and the flange or shank of the T extending radially from the cross. The edges of the three flanges that thus form the T are rounded at their ends and slope from the flange 13, so that the outermost points of the flange forming the shanks are at the point of junction with the flange 13. The traction flanges 11 have the same shape as the flanges that form the shanks of the T's of the tractor lugs 10. The flanges 11 extend from the point of juncture between the flanges that form the shank of the T shaped tractor lugs and extend across the band 12 or rim proper of the tractor wheel.

Additional tractor flanges 15 are located intermediate the tractor flanges 11. They are shaped the same as the tractor flanges 11. This arrangement of the parts of the bull wheel forms an exceedingly strong tractor not easily broken by jars and strains to which the wheel in its ordinary use may be subjected. It is furthermore so designed as to best withstand the strains and stresses to which the tractor wheel in its use is subjected. The flange 13 forms a rolling edge for supporting the wheel when it is moving over a paved road so that there will be free smooth movement. The softer the soil the farther will the flange 13 sink into the soil and thus cause engagement of an increased area of contact between the sides of the flanges 10, 11 and 15 with the soil, which will give greater opportunity for increasing the traction of the wheel on the soil that it is moving over. If the wheel is moving over sand or mud the traction flanges and lugs may sink so that the wheel is supported by the band 12 or rim proper, whereupon the total areas of the sides of the tractor flanges will engage the soil. The tractor lugs 10 being disposed in spaced relation give full opportunity for the soil to return to the road or track, and clogging of the wheel is prevented along the side of the flange 13 on which the lugs 10 are located. The flange 13 may be notched to form teeth 20 which will cut the soil in cold weather and enable better traction.

The tractor wheel is driven by means of the gear wheel 16 which is secured by bolts 17 to the Y shaped spokes of the bull wheel near the crotch of the Y. The bolts 17 extend through bosses formed in the flanges 5. The gear wheel 16 is provided with a plurality of winged brackets 18 that extend from the inside of the rim of the gear wheel 16 towards the spokes 2 of the bull wheel and terminate in ears 19 through which the bolts 17 extend. The ears 19 rest on bosses located on the inside of the bull wheel and in the flanges 5 located on one side of the wheel. The winged brackets 18 form an exceedingly efficient shape for withstanding the strains produced in the transmission of the drawing force of the tractor to the bull wheel. Thus by my invention I have provided an exceedingly efficient and durable bull wheel for tractors.

I claim:

In a bull wheel, a cylindrical band forming a body portion of the rim of the bull wheel, a serrated flange extending from one edge of the band in a plane at right angles to the axis of the bull wheel, tractor flanges extending in the plane of the axis of the bull wheel and radially from the axis and from the outer edge of the first named flange to an edge of the cylindrical band, the edges of the tractor flanges sloping from the outer edge of the first named flange toward the edge of the band, and tractor lugs extending laterally from the band and having T shaped cross sections, the cross of the T located in planes tangential to the band at the points at which the lugs are located, and the shanks of the T forming a radially extending flange, the outer edge of the T portion of the lug sloping from the outer edge of the first named flange towards the end of the lug.

In testimony whereof I have hereunto signed my name to this specification.

SAMUEL W. RAYMOND.